United States Patent
Lee et al.

(10) Patent No.: US 10,380,024 B2
(45) Date of Patent: Aug. 13, 2019

(54) DRAM AND METHOD OF OPERATING THE SAME IN AN HIERARCHICAL MEMORY SYSTEM

(71) Applicant: NANYA TECHNOLOGY CORPORATION, New Taipei (TW)

(72) Inventors: Chung-Hsun Lee, New Taipei (TW); Hsien-Wen Liu, Taoyuan County (TW)

(73) Assignee: NANYA TECHNOLOGY CORPORATION, New Taipei (TW)

( * ) Notice: Subject to any disclaimer, the term of this patent is extended or adjusted under 35 U.S.C. 154(b) by 0 days.

(21) Appl. No.: 15/860,032

(22) Filed: Jan. 2, 2018

(65) Prior Publication Data

US 2019/0171572 A1 Jun. 6, 2019

Related U.S. Application Data

(60) Provisional application No. 62/594,650, filed on Dec. 5, 2017.

(51) Int. Cl.
*G06F 12/0888* (2016.01)
*G06F 13/16* (2006.01)

(52) U.S. Cl.
CPC ...... *G06F 12/0888* (2013.01); *G06F 13/1673* (2013.01); *G06F 2212/20* (2013.01)

(58) Field of Classification Search
CPC ............ G06F 12/0888; G06F 13/1673; G06F 2212/20
See application file for complete search history.

(56) References Cited

U.S. PATENT DOCUMENTS

| | | | | |
|---|---|---|---|---|
| 5,745,913 A | * | 4/1998 | Pattin ................. | G06F 12/0215 711/105 |
| 5,761,706 A | * | 6/1998 | Kessler ............... | G06F 12/0862 711/118 |
| 2014/0181417 A1 | * | 6/2014 | Loh .................... | G06F 12/0828 711/141 |
| 2018/0165204 A1 | * | 6/2018 | Venkatesh ........... | G06F 12/0862 |

* cited by examiner

*Primary Examiner* — Ajay Ojha
(74) *Attorney, Agent, or Firm* — Muncy, Geissler, Olds & Lowe, P.C

(57) ABSTRACT

The present disclosure provides a dynamic random access memory (DRAM), and a method of operating the same. The DRAM includes a memory row and a buffer. The memory row is configured to store a data, wherein the memory row does not provide the data to the buffer in response to a request to read the data. The buffer is configured to store the data as a temporarily-stored data, wherein the buffer provides the temporarily-stored data in response to the request.

20 Claims, 16 Drawing Sheets

DRAM AND METHOD OF OPERATING THE SAME IN AN HIERARCHICAL MEMORY SYSTEM

PRIORITY CLAIM AND CROSS-REFERENCE

This application claims the benefit of provisional application Ser. 62/594,650 filed on Dec. 5, 2017, entitled "DRAM AND METHOD OF OPERATING THE SAME" the disclosure of which is hereby incorporated by reference in its entirety.

TECHNICAL FIELD

The present disclosure relates to a dynamic random access memory (DRAM) and a method of operating the same, and more particularly, to management of a read operation in a DRAM.

DISCUSSION OF THE BACKGROUND

Dynamic random access memory (DRAM) is a type of random access memory that stores each bit of data in a separate capacitor. A simplest DRAM cell comprises a single N-type metal-oxide-semiconductor (NMOS) transistor and a single capacitor. If charge is stored in the capacitor, the cell is said to store a logic HIGH, depending on the convention used. If no charge is present, the cell is said to store a logic LOW. Because the charge in the capacitor dissipates over time, DRAM systems require additional refreshing circuitries to periodically refresh the charge stored in the capacitors. Since a capacitor can store only a very limited amount of charge, in order to quickly distinguish the difference between a logic HIGH and a logic LOW, two bit lines (BLs) are typically used for each bit, wherein the first bit line in the bit line pair is known as a bit line true (BLT) and the other bit line in the bit line pair is the bit line complement (BLC). The single NMOS transistor's gate is controlled by a word line (WL).

This Discussion of the Background section is for background information only. The statements in this Discussion of the Background are not an admission that the subject matter disclosed in this section constitutes a prior art to the present disclosure, and no part of this section may be used as an admission that any part of this application, including this Discussion of the Background section, constitutes prior art to the present disclosure.

SUMMARY

One aspect of the present disclosure provides a DRAM. The DRAM includes a memory row and a buffer. The memory row is configured to store a data, wherein the memory row does not provide the data to the buffer in response to a request to read the data. The buffer is configured to store the data as a temporarily-stored data, wherein the buffer provides the temporarily-stored data in response to the request.

In some embodiments, the memory row is kept deactivated when the buffer provides the temporarily-stored data in response to the request.

In some embodiments, the request is a second request following a first request, wherein the buffer is configured to store the temporarily-stored data in response to a first request to read the data.

In some embodiments, the DRAM further comprises an address register and a control logic. The address register includes a first latch and a second latch. The first latch is configured to latch a first address indicating the memory row in response to the first request. The second latch is configured to latch the first address in response to the second request. The control logic is configured to keep the memory row deactivated and control the buffer to directly provide the temporarily-stored data in response to an event, in which both the first latch and the second latch latch the first address.

In some embodiments, the request is a second request following a first request, wherein the buffer is configured to store the temporarily-stored data in response to a first request to write the data into the memory row.

Another aspect of the present disclosure provides a DRAM. The DRAM includes a first memory row, a second memory row, a first buffer and a second buffer. The first memory row is configured to store a first data. The second memory row is configured to store a second data. The first buffer is configured to temporarily store the first data as a first temporarily-stored data in response to a first request to read the first data. The second buffer is configured to temporarily store the second data as a second temporarily-stored data in response to a second request, following the first request, to read the second data, wherein the first buffer retains the first temporarily-stored data in response to the second request, and wherein the first buffer provides the first temporarily-stored data in response to a third request, following the second request, to read the first data.

In some embodiments, the second buffer provides the second temporarily-stored data in response to a fourth request, following the second request, to read the second data.

In some embodiments, the first buffer does not store the second data as the second temporarily-stored data in response to the second request.

In some embodiments, the memory row is kept deactivated when the first buffer provides the first temporarily-stored data in response to the third request.

In some embodiments, the DRAM further includes an address register and a control logic. The address register includes a first latch, a second latch and a third latch. The first latch is configured to latch a first address indicating the first memory row in response to the first request. The second latch is configured to latch a second address in response to the second request. The third latch is configured to latch the first address in response to the third request. The control logic is configured to keep the first memory row deactivated and control the first buffer to directly provide the first temporarily-stored data in response to an event, in which both the first latch and the third latch latch the first address.

In some embodiments, the DRAM further includes a third memory row configured to store a third data, wherein one of the first buffer and the second buffer temporarily stores the third data as a third temporarily-stored data in response to a fifth request, following the second request, to read the third data.

In some embodiments, the first buffer temporarily stores the third temporarily-stored data in response to the fifth request.

In some embodiments, the second buffer provides the second temporarily-stored data in response to a sixth request, following the fifth request, to read the second data.

In some embodiments, the first memory row is of a first bank of the DRAM, and the second memory row is of a second bank of the DRAM.

Another aspect of the present disclosure provides a method. The method includes storing a data by a memory row; and not providing the data from the memory row in response to a request to read the data.

In some embodiments, the method further includes storing the data as a temporarily-stored data in a buffer; and providing the temporarily-stored data from the buffer in response to the request.

In some embodiments, the method further includes keeping the memory row deactivated when the buffer provides the temporarily-stored data in response to the request.

In some embodiments, the request is a second request following a first request. The method further includes storing the temporarily-stored data in the buffer in response to the first request to read the data.

In some embodiments, the request is a second request following a first request. The method includes storing the temporarily-stored data in the buffer in response to a first request to write the data into the memory row.

In the present disclosure, in a circumstance in which the second request requests the same data as the first request, there is no need to activate the memory row in response to the second request. The buffer is able to provide the temporarily-stored data as requested by the second request. As a result, a read time of the DRAM is conserved, and the DRAM is time efficient.

In some existing DRAMs, after a memory row provides a data in response to a first request, the memory row is closed even though a second request, following the first request, requests the same data as the first data. Consequently, it is necessary to activate the memory row again in response to the second request. As a result, such DRAM is not time efficient.

In some applications, even though the memory row is able to be kept activated if the first request and the second request request the same data, it still takes time to move the data from the memory row to a buffer. As a result, such DRAM is still not time efficient.

The foregoing has outlined rather broadly the features and technical advantages of the present disclosure in order that the detailed description of the disclosure that follows may be better understood. Additional features and technical advantages of the disclosure are described hereinafter, and form the subject of the claims of the disclosure. It should be appreciated by those skilled in the art that the concepts and specific embodiments disclosed may be utilized as a basis for modifying or designing other structures, or processes, for carrying out the purposes of the present disclosure. It should also be realized by those skilled in the art that such equivalent constructions do not depart from the spirit or scope of the disclosure as set forth in the appended claims.

BRIEF DESCRIPTION OF THE DRAWINGS

A more complete understanding of the present disclosure may be derived by referring to the detailed description and claims. The disclosure should also be understood to be connected to the figures' reference numbers, which refer to similar elements throughout the description.

DETAILED DESCRIPTION

Figure 1:
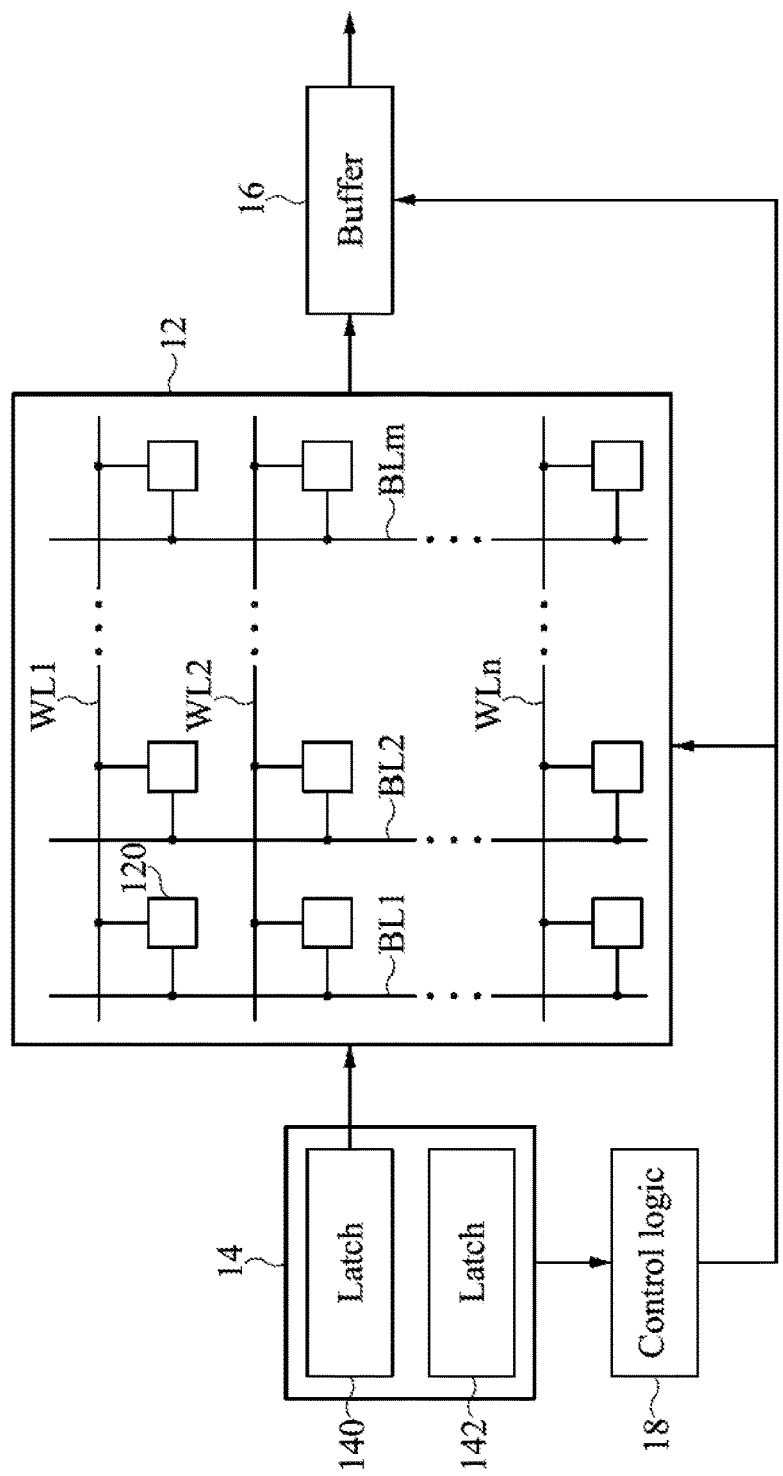
FIG. 1 is a schematic diagram of a dynamic random access memory (DRAM), in accordance with some embodiments of the present disclosure.

Embodiments, or examples, of the disclosure illustrated in the drawings are now described using specific language. It shall be understood that no limitation of the scope of the disclosure is hereby intended. Any alteration or modification of the described embodiments, and any further applications of principles described in this document, are to be considered as normally occurring to one of ordinary skill in the art to which the disclosure relates. Reference numerals may be repeated throughout the embodiments, but this does not necessarily mean that feature(s) of one embodiment apply to another embodiment, even if they share the same reference numeral.

It shall be understood that, although the terms first, second, third, etc. may be used herein to describe various elements, components, regions, layers or sections, these elements, components, regions, layers or sections are not limited by these terms. Rather, these terms are merely used to distinguish one element, component, region, layer or section from another region, layer or section. Thus, a first element, component, region, layer or section discussed below could be termed a second element, component, region, layer or section without departing from the teachings of the present inventive concept.

The terminology used herein is for the purpose of describing particular example embodiments only and is not intended to be limited to the present inventive concept. As used herein, the singular forms "a," "an" and "the" are intended to include the plural forms as well, unless the context clearly indicates otherwise. It shall be further understood that the terms "comprises" and "comprising," when used in this specification, point out the presence of stated features, integers, steps, operations, elements, or components, but do not preclude the presence or addition of one or more other features, integers, steps, operations, elements, components, or groups thereof.

FIG. 1 is a schematic diagram of a dynamic random access memory (DRAM) 10, in accordance with some embodiments of the present disclosure. Referring to FIG. 1, the DRAM 10 includes a memory array 12, an address register 14, a buffer 16 and a control logic 18.

The memory array 12 includes a plurality of memory cells 120 arranged in a two-dimensional array. The memory cell 120 functions to store data. The memory cells 120 in the same row can be designated as a memory row, and can be illustrated with a block for convenience in the following discussion. In addition to the memory cells 120, the memory array 12 further includes a plurality of word lines WL1 to WLn and a plurality of bit lines BL1 to BLm, wherein n and m are positive integers. The word lines WL1 to WLn and the bit lines BL1 to BLm are used to control operation of the associated memory cells 120.

The address register 14 includes latches 140 and 142. Each of the latches 140 and 142 functions to store an address according to which the memory cell 120 is addressed.

The buffer 16 functions to temporarily store data provided by the memory cells 120 in the same row as a temporarily-stored data, and such data is called a row data hereinafter when appropriate. That is, the row data includes data of each of the memory cells 120 in the same row. In some embodiments, the buffer 16 provides the temporarily-stored data according to a column address of the address stored in the address register 14.

The control logic 18 functions to control activation of the memory array 12 based on the addresses stored by the latches 140 and 142, which will be described in detail with reference to FIGS. 2 to 10.

In the present embodiment, the DRAM 10 includes two latches 140 and 142. Hence, in a circumstance in which the latches 140 and 142 store the same row address, there is no need to activate a memory row indicated by the same row address, and the DRAM 10 is still able to provide a data stored in the memory row, as will be discussed in detail with reference to FIGS. 2 to 10. As a result, a read time of the DRAM 10 is conserved, and the DRAM 10 is time efficient.

Figure 2:
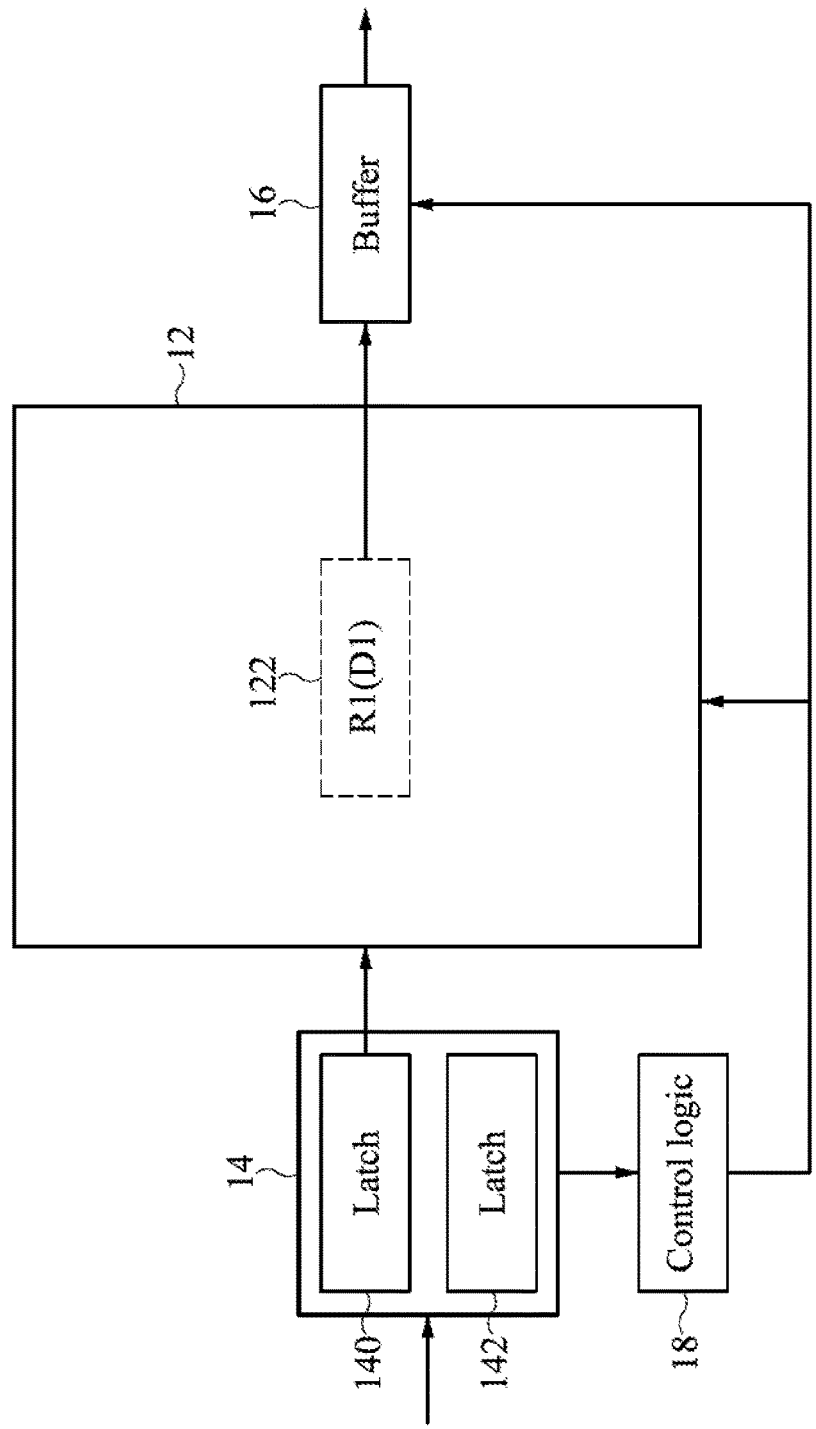
FIG. 2 is a schematic diagram illustrating an initial state of the DRAM shown in FIG. 1, in accordance with some embodiments of the present disclosure.

FIG. 2 is a schematic diagram illustrating an initial state of the DRAM 10 shown in FIG. 1, in accordance with some embodiments of the present disclosure. Referring to FIG. 2, the memory array 12 includes a memory row 122. The memory row 122, in the initial state, stores a row data R1 including a data D1. Moreover, for clarity of discussion, in the initial state, each of the latches 140 and 142 does not store any address, and the buffer 16 does not store any row data.

In addition, when the memory row 122 is not accessed, the memory row 122 is kept deactivated as depicted by a dotted frame. That is, the memory row 122 is in a deactivated state.

Figure 3:
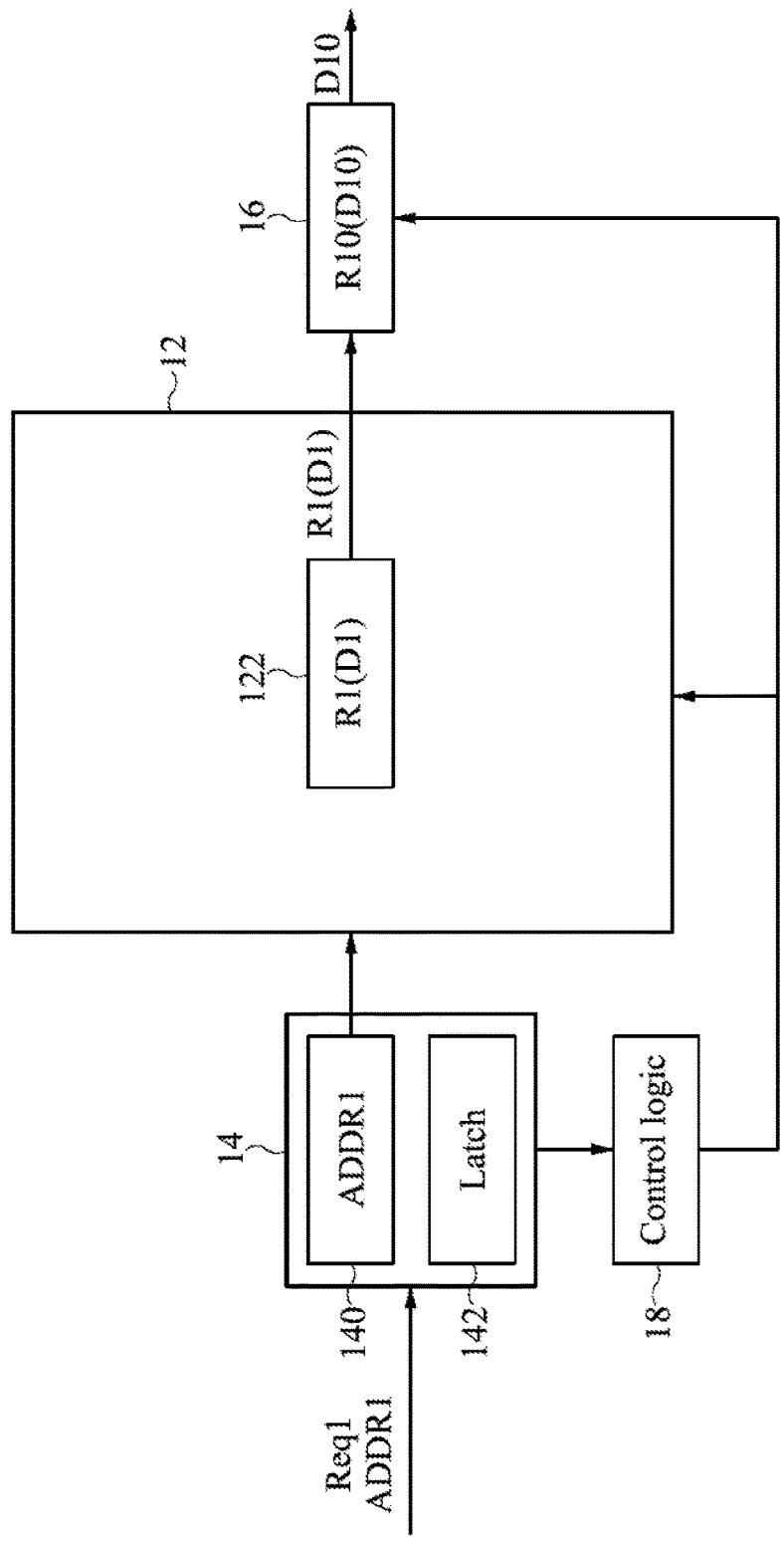
FIG. 3 is a schematic diagram illustrating an operation in a first scenario of operating the DRAM shown in FIG. 1, in accordance with some embodiments of the present disclosure.
Figure 5:
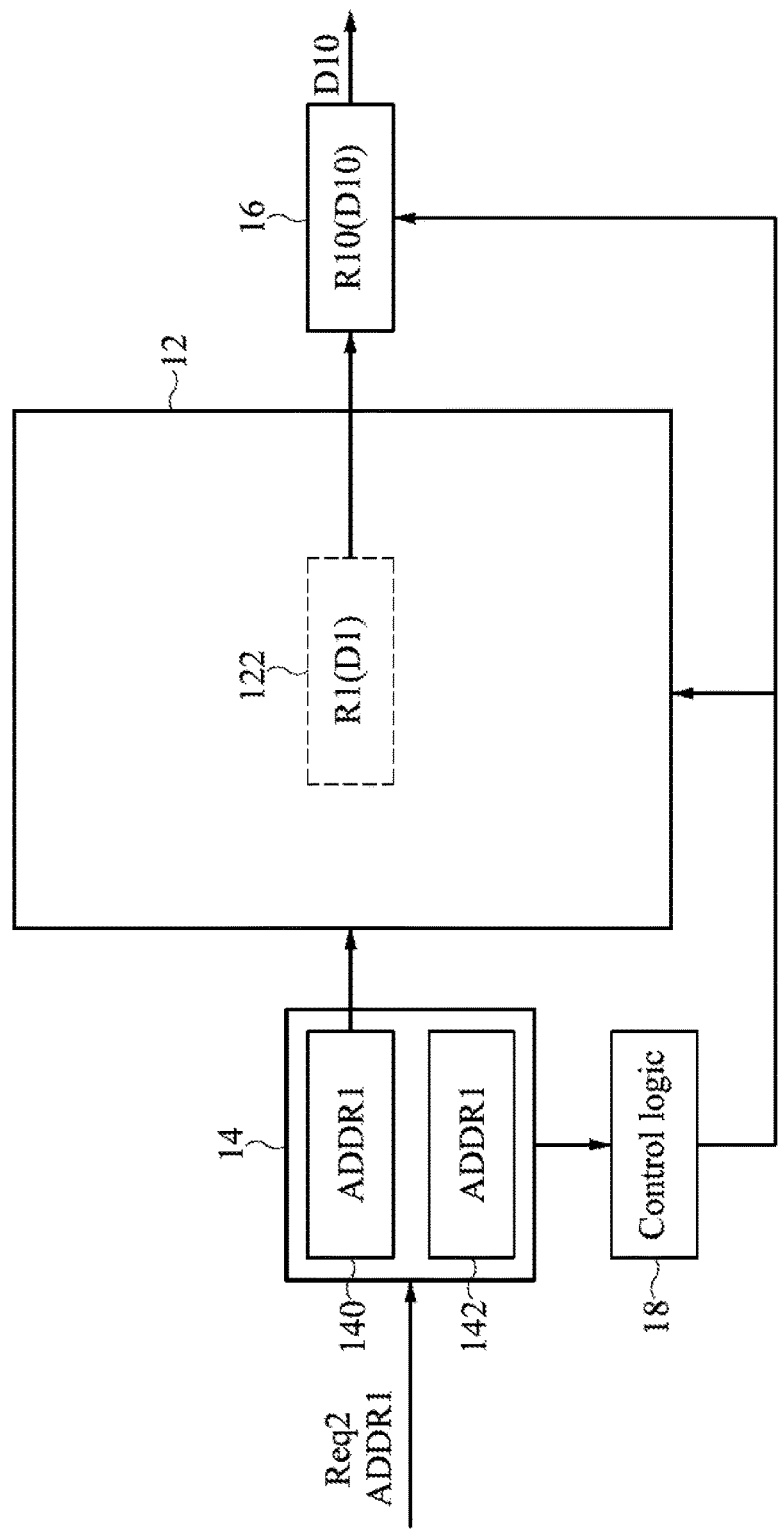
FIG. 5 is a schematic diagram illustrating yet another operation in the first scenario of operating the DRAM shown in FIG. 1, in accordance with some embodiments of the present disclosure.

FIG. 3 is a schematic diagram illustrating an operation in a first scenario of operating the DRAM shown in FIG. 1, in accordance with some embodiments of the present disclosure. In the first scenario, a first request Req1 to read the data D1 is received as shown in FIG. 3, and a second request Req2, immediately following the first request Req1, to read the data D1 is received as shown in FIG. 5.

Referring to FIG. 3, the first request Req1 is received. In response to the first request Req1, the latch 140 stores an address ADDR1 indicating the memory row 122. To read the data D1, the memory row 122 is activated, as depicted by a solid frame, in response to, for example, an ACTIVE command That is, the memory row 122 is changed from a deactivated state to an activated state.

In response to the first request Req1, the memory row 122 provides the row data R1 to the buffer 16, and the buffer 16 temporarily stores the row data R1 as a temporarily-stored row data R10. Similarly, the buffer 16 temporarily stores the data D1 as a temporarily-stored data D10. In the present disclosure, content of the data D1 is substantially the same as that of the temporarily-stored data D10. Distortion of data during transmission is not taken into consideration. Subsequently, the buffer 16 provides the temporarily-stored data D10 in response to the first request Req1.

Figure 4:
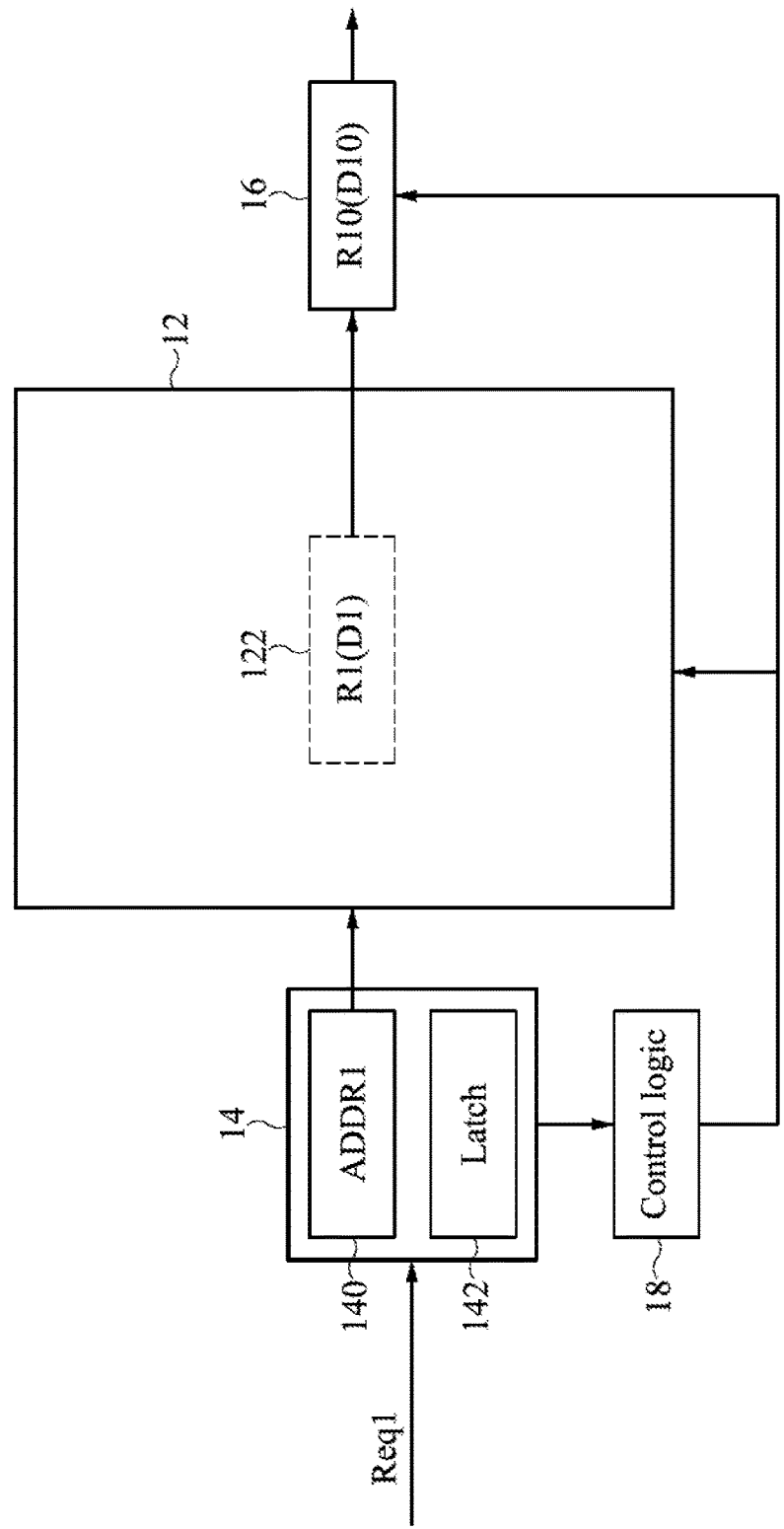
FIG. 4 is a schematic diagram illustrating another operation in the first scenario of operating the DRAM shown in FIG. 1, in accordance with some embodiments of the present disclosure.

FIG. 4 is a schematic diagram illustrating another operation in the first scenario of operating the DRAM 10 shown in FIG. 1, in accordance with some embodiments of the present disclosure. Referring to FIG. 4, after the memory row 122 provides the row data R1, the memory row 122 is changed back to a deactivated state in response to, for example, a PRE-CHARGE command.

As mentioned in the embodiments of FIGS. 2 to 4, when it is desired to read a data stored by a memory row, it is necessary to take time to activate the memory row. Moreover, after the memory row provides the data, it is necessary to consume additional electrical power to deactivate the memory row. Other operations of accessing a memory row, which are not mentioned in the embodiments of FIGS. 2 to 4, may take place.

FIG. 5 is a schematic diagram illustrating another operation in the first scenario of operating the DRAM 10 shown in FIG. 1, in accordance with some embodiments of the present disclosure. Referring to FIG. 5, the second request Req2, following the first request Req1, is received. In response to the second request Req2, the latch 142 latches the address ADDR1.

The control logic 18 keeps the memory row 122 deactivated as depicted by a dotted frame in response to an event, in which both the latches 140 and 142 store the address ADDR1. Consequently, the memory row 122, which is deactivated, does not provide the row data R1 to the buffer 16 in response to the second request Req2. Similarly, the memory row 122, which is deactivated, does not provide the data D1 to the buffer 16.

In response to the second request Req2, the control logic 18 controls the buffer 16, such that the buffer 16 directly provides the temporarily-stored data D10, which is temporarily stored in itself in response to the first request Req1. When the buffer 16 provides the temporarily-stored data D10 in response to the second request Req2, the memory row 122 is kept deactivated.

In the present disclosure, in a circumstance in which the second request Req2 requests the same data D1 as the first request Req1, there is no need to, in response to the second request Req2, activate the memory row 122. The buffer 16 is able to provide the temporarily-stored data D10 as requested by the second request Req2. As a result, a read time of the DRAM 10 is conserved, and the DRAM 10 is time efficient.

In some existing DRAMs, after a memory row provides a data in response to a first request, the memory row is closed even though a second request, following the first request, requests the same data as the first data. Consequently, it is necessary to activate the memory row again in response to the second request. As a result, such DRAM is not time efficient.

In some applications, although the memory row is able to be kept activated if the first request and the second request request the same data, it still takes time to move the data from the memory row to a buffer. As a result, such DRAM is still not time efficient.

Figure 6:
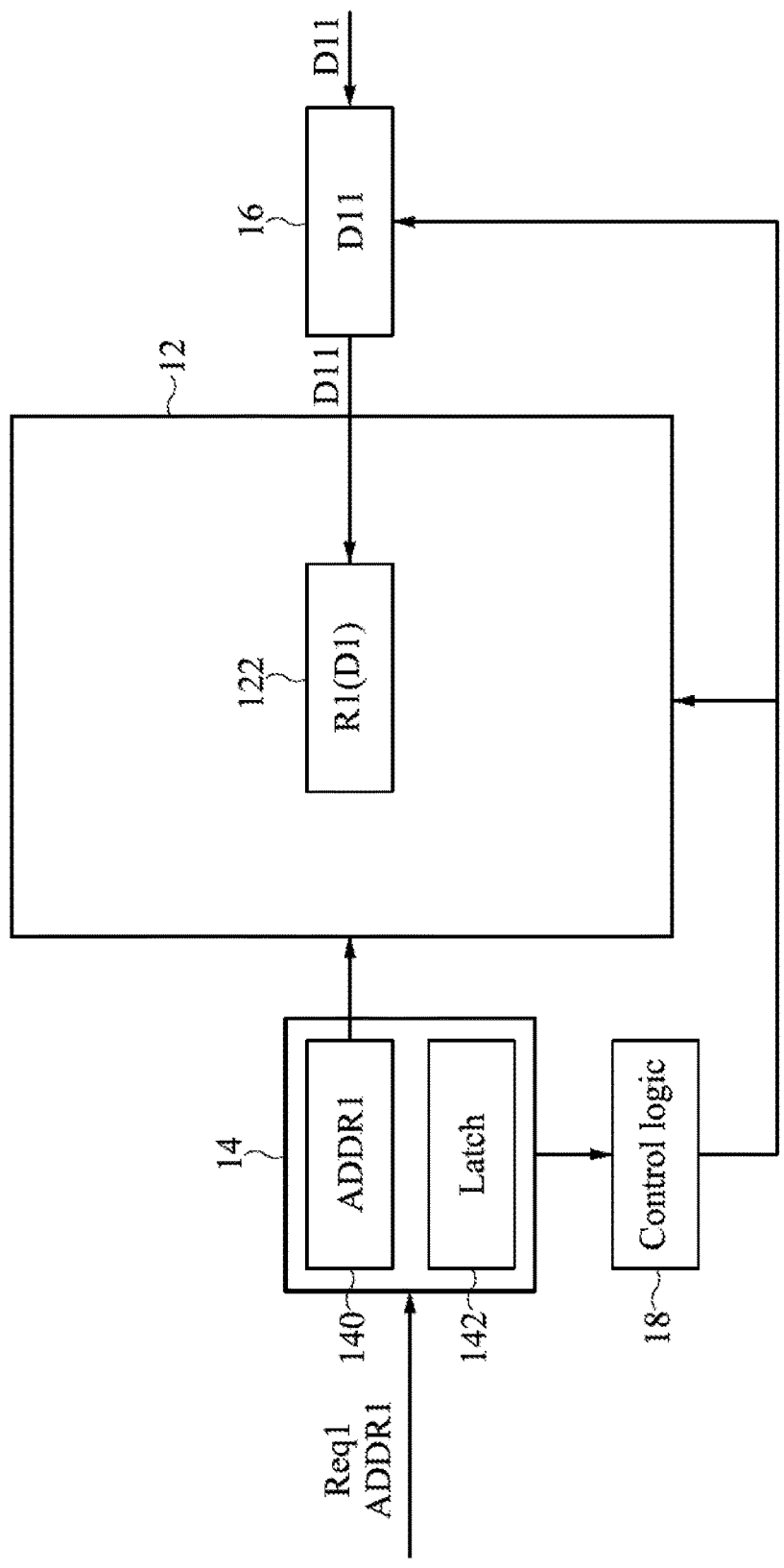
FIG. 6 is a schematic diagram illustrating an operation in a second scenario of operating the DRAM shown in FIG. 1, in accordance with some embodiments of the present disclosure.

FIG. 6 is a schematic diagram illustrating an operation in a second scenario of operating the DRAM 10 shown in FIG. 1, in accordance with some embodiments of the present disclosure. In the second scenario, a first request Req1 to write a data D11 is received, and a second request Req2, immediately following the first request Req1, to read the data D11 is received.

Referring to FIG. 6, it is desired to write the data D11 into the memory row 122. The data D11 is written into the buffer 16, and subsequently the buffer 16 provides the data D11 to the memory row 122. In addition, the latch 140 latches an address ADDR1 indicating the memory row 122.

Figure 7:
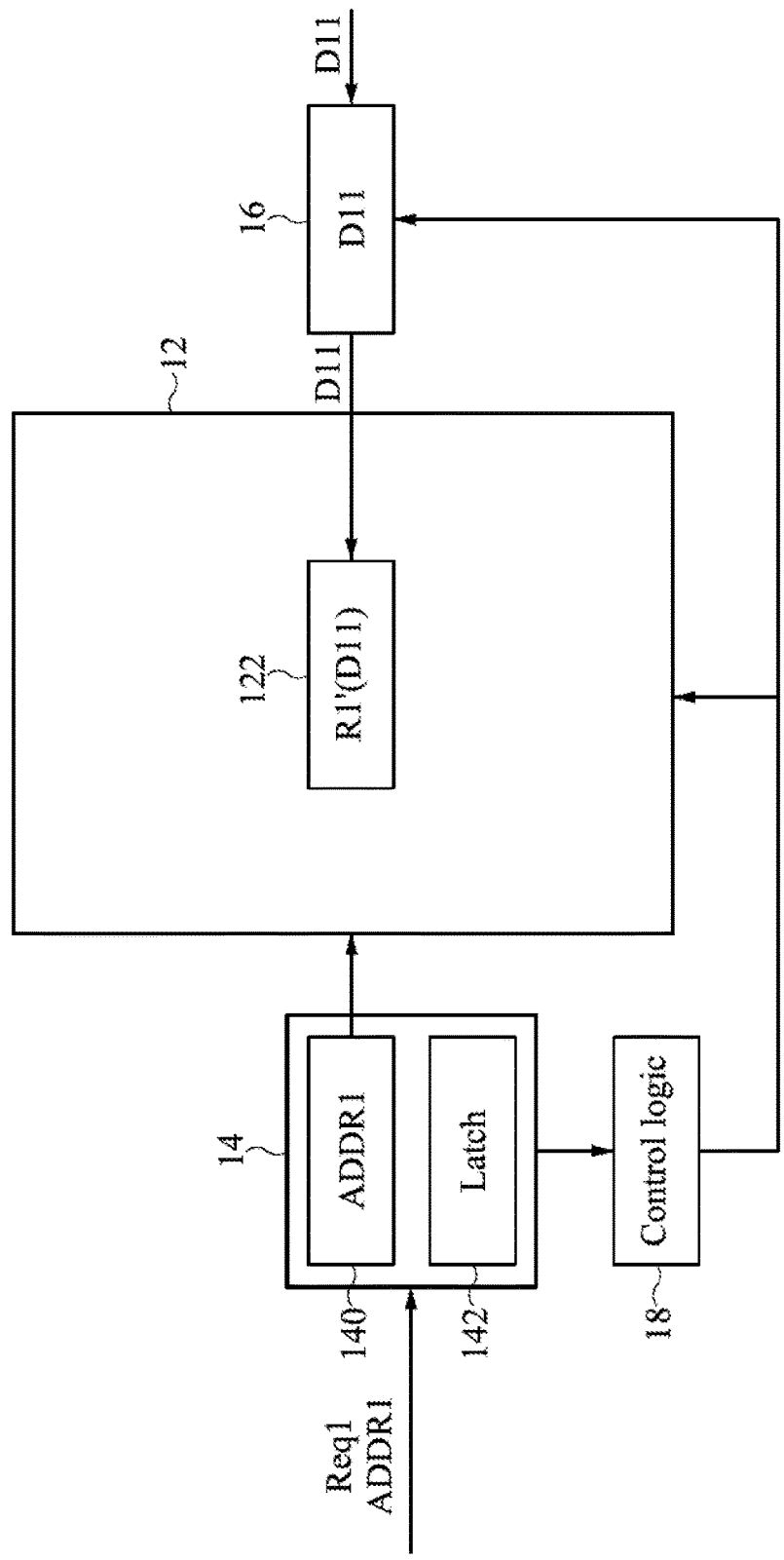
FIG. 7 is a schematic diagram illustrating another operation in the second scenario of operating the DRAM shown in FIG. 1, in accordance with some embodiments of the present disclosure.

FIG. 7 is a schematic diagram illustrating another operation in the second scenario of operating the DRAM 10 shown in FIG. 1, in accordance with some embodiments of the present disclosure. Referring to FIG. 7, the row data R1 is updated to a row data R1' including the data D11. Data other than the data D11 in the row data R1' may be the same as data other than the data D1 in the row data R1.

Figure 8:
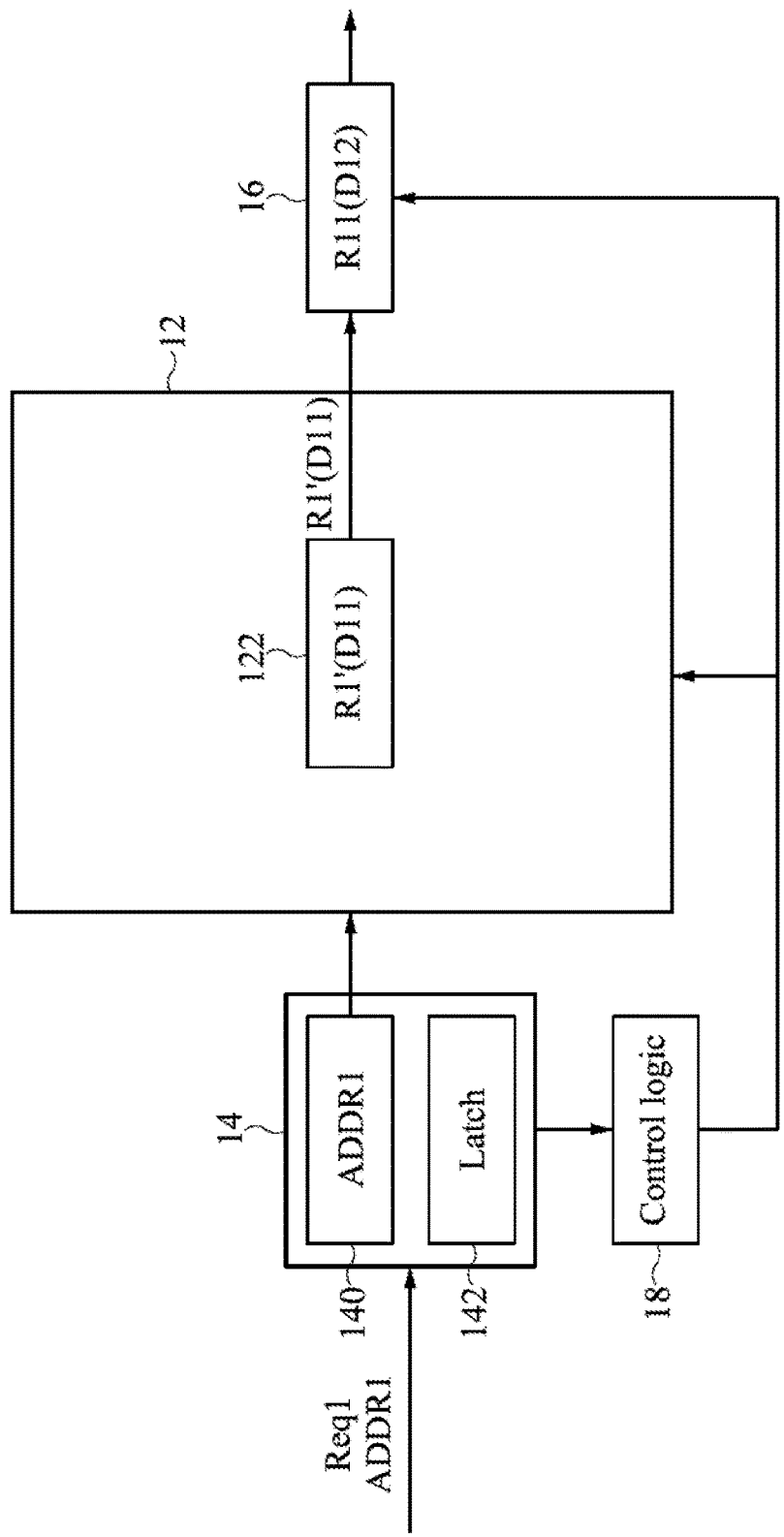
FIG. 8 is a schematic diagram illustrating still another operation in the second scenario of operating the DRAM shown in FIG. 1, in accordance with some embodiments of the present disclosure.

FIG. 8 is a schematic diagram illustrating still another operation in the second scenario of operating the DRAM shown in FIG. 1, in accordance with some embodiments of the present disclosure. Referring to FIG. 8, after the update, the memory row 122 provides the row data R1' to the buffer 16. The buffer 16 temporarily stores the row data R1' as a temporarily-stored row data R11. Similarly, the buffer 16 temporarily stores the data D11 as a temporarily-stored data D12. The written operation described in the embodiments of FIGS. 6 to 8 merely serves as an example. The present disclosure includes other possible implementations.

Figure 9:
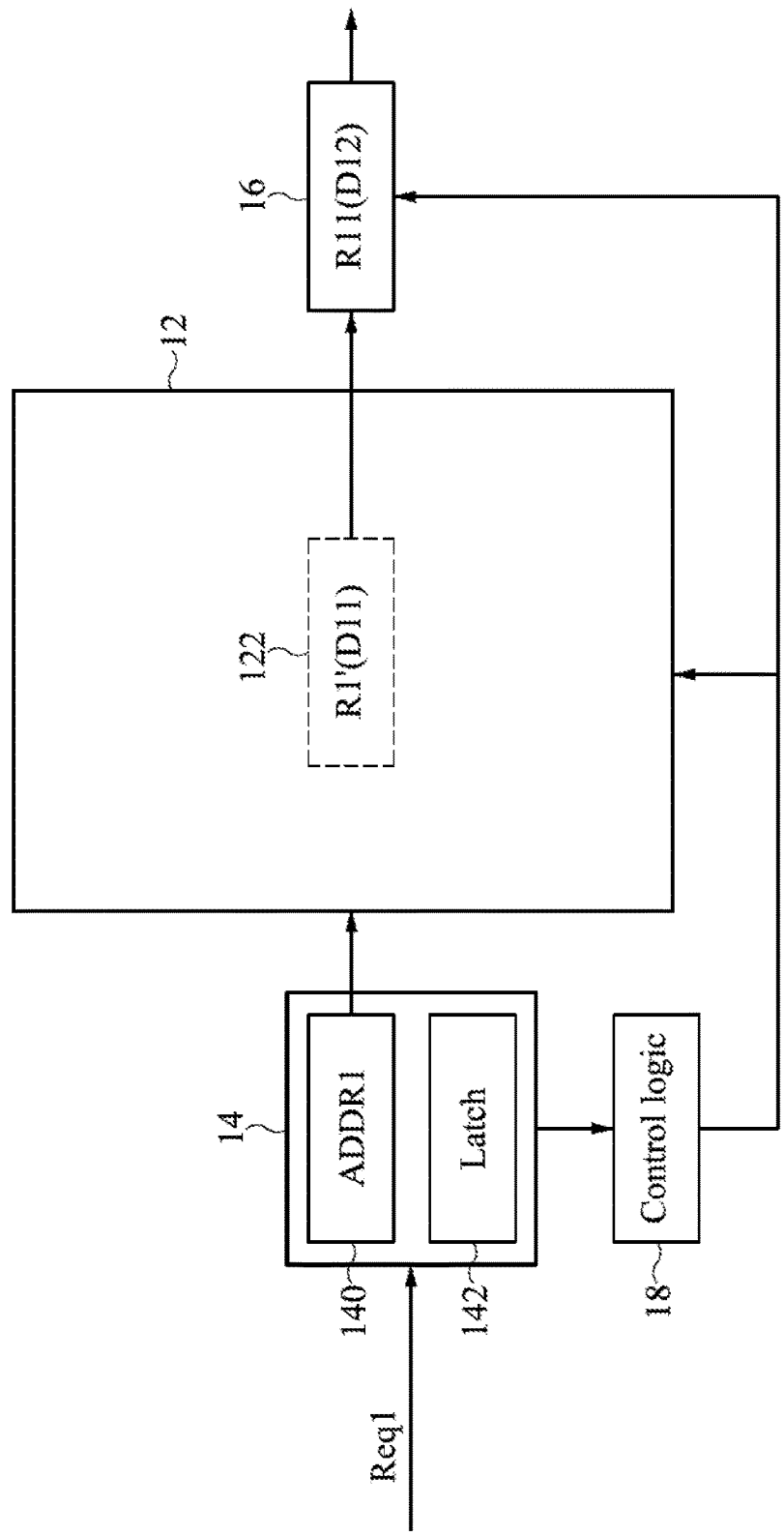
FIG. 9 is a schematic diagram illustrating yet another operation in the second scenario of operating the DRAM shown in FIG. 1, in accordance with some embodiments of the present disclosure.

FIG. 9 is a schematic diagram illustrating yet another operation in the second scenario of operating the DRAM 10 shown in FIG. 1, in accordance with some embodiments of the present disclosure. Referring to FIG. 9, after the memory row 122 provides the row data R1' to the buffer 16, the memory row 122 is closed in response to a PRE-CHARGE command as depicted by a dotted frame.

Figure 10:
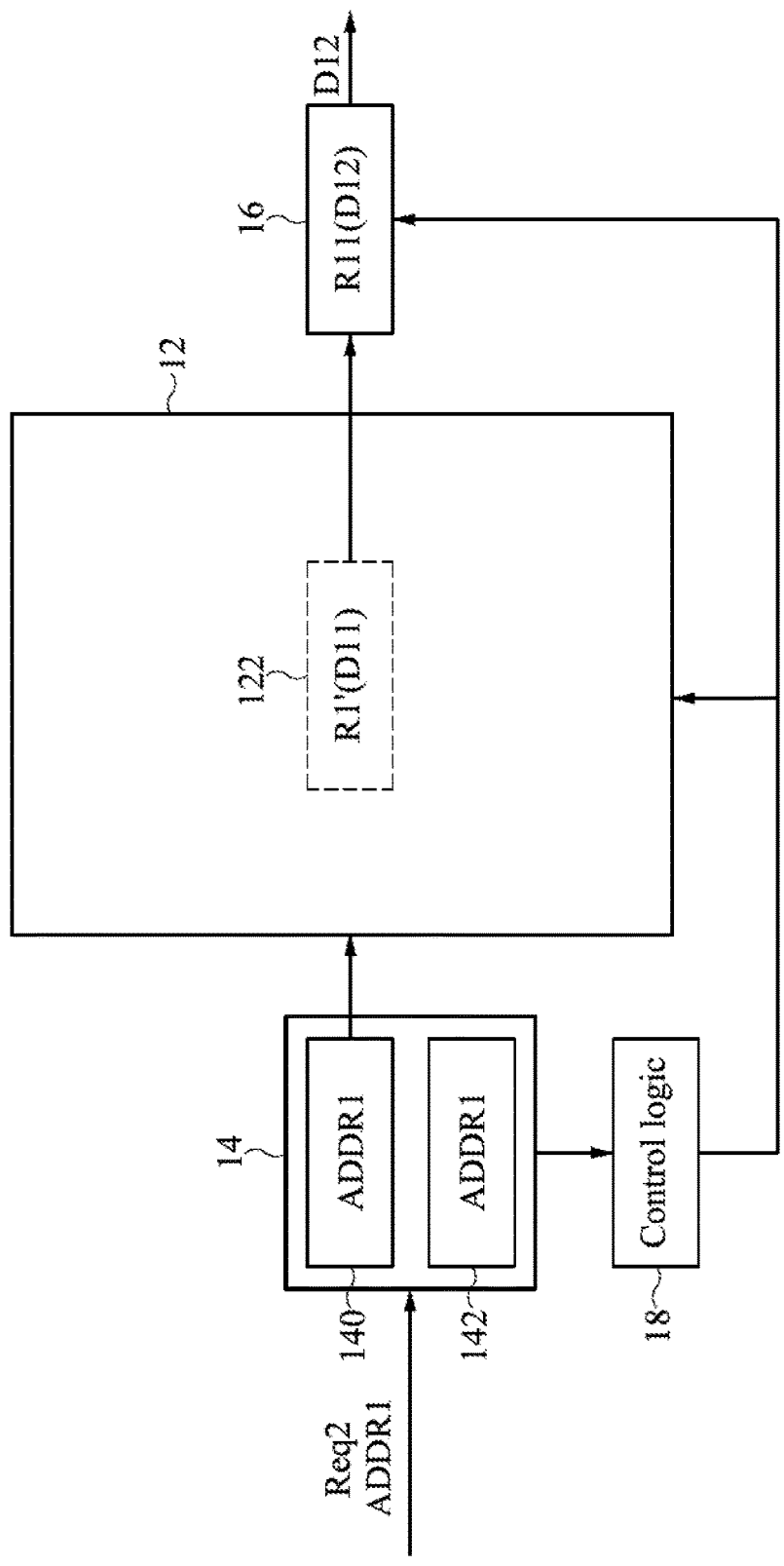
FIG. 10 is a schematic diagram illustrating yet still another operation in the second scenario of operating the DRAM shown in FIG. 1, in accordance with some embodiments of the present disclosure.

FIG. 10 is a schematic diagram illustrating yet still another operation in the second scenario of operating the DRAM shown in FIG. 1, in accordance with some embodiments of the present disclosure. Referring to FIG. 10, the second request Req2 is received. In response to the second request Req2, the latch 142 latches the address ADDR1.

Similar to the operation described in the embodiment of FIG. 5, the control logic 18 keeps the memory row 122 deactivated. The memory row 122, which is deactivated, does not provide the row data R1' including the data D11 to the buffer 16 in response to the second request Req2. In addition, in response to the second request Req2, the buffer 16 provides the temporarily-stored data D12, which is temporarily stored in itself in response to the first request Req1.

In the present disclosure, in a circumstance in which the second request Req2 requests the same data D11 as the first request Req1, there is no need to activate the memory row 122 in response to the second request Req2. The buffer 16 is able to provide the temporarily-stored data D12 as requested by the second request Req2. As a result, a read time of the DRAM 10 is conserved, and the DRAM 10 is time efficient.

In some existing DRAMs, after a data is written into a memory row in response to a first request, the memory row is closed even though a second request, following the first request, requests the same data as the first data. Consequently, it is necessary to activate the memory row again in response to the second request. As a result, such DRAM is not time efficient.

Figure 11:
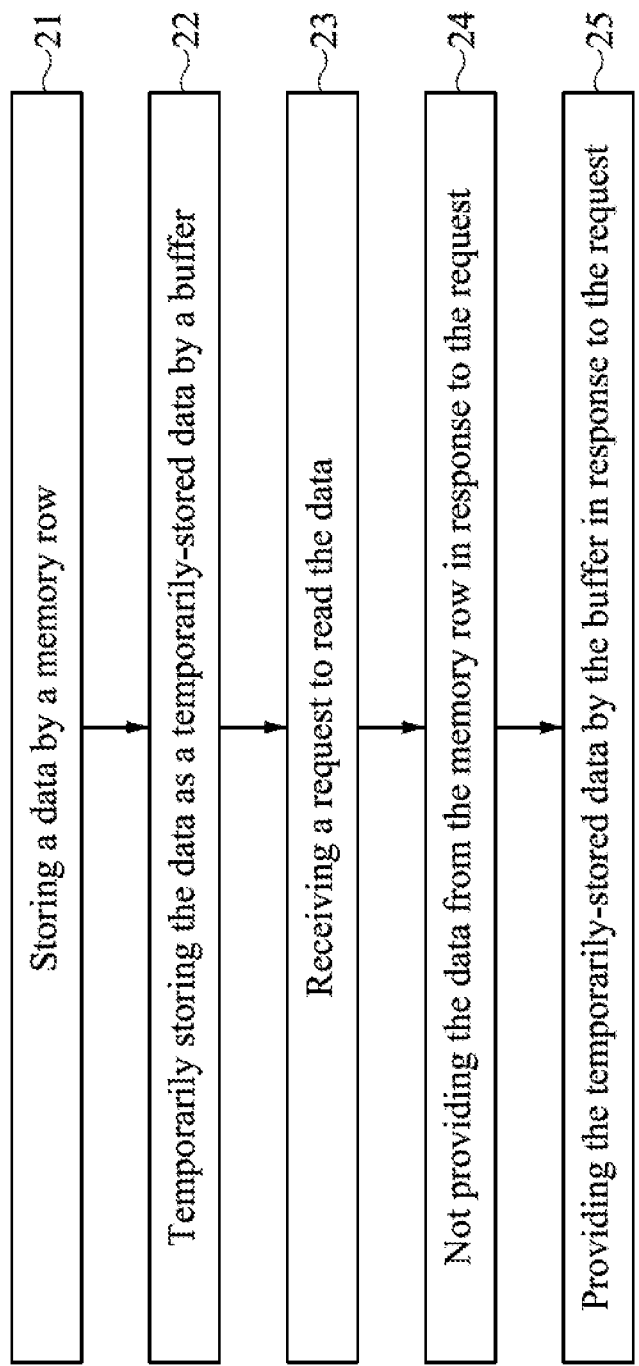
FIG. 11 is a flow chart of a method, in accordance with some embodiments of the present disclosure.

FIG. 11 is a flow chart of a method 20, in accordance with some embodiments of the present disclosure. Referring to FIG. 11, the method 20 includes operations 21, 22, 23, 24 and 25.

The method 20 begins with operation 21, in which a memory row stores a data.

The method 20 proceeds to operation 22, in which a buffer temporarily stores the data as a temporarily-stored data.

The method 20 continues with operation 23, in which a request to read the data is received.

The method 20 proceeds to operation 24, in which the memory row does not provide the data in response to the request.

The method 20 continues with operation 25, in which the buffer provides the temporarily-stored data in response to the request.

The method 20 is merely an example, and is not intended to limit the present disclosure beyond what is explicitly recited in the claims. Additional operations can be provided before, during, and after the method 20, and some operations described can be replaced, eliminated, or moved around for additional embodiments of the method.

In the present disclosure, by using the method 20 to operate a DRAM, a read time of the DRAM is conserved, and the DRAM is time efficient.

Figure 12:
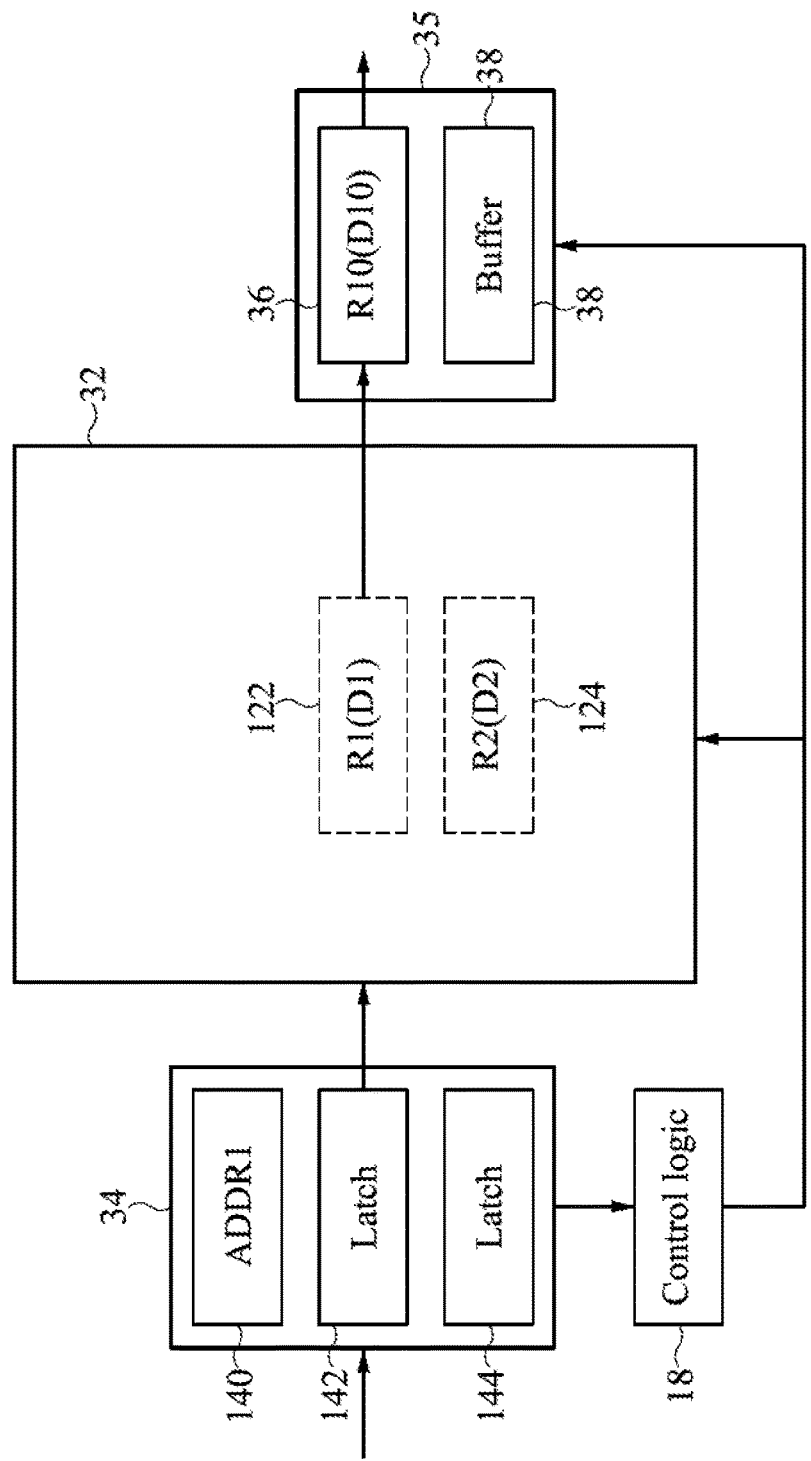
FIG. 12 is a schematic diagram illustrating an operation of another dynamic random access memory (DRAM), in accordance with some embodiments of the present disclosure.

FIG. 12 is a schematic diagram illustrating an operation of another dynamic random access memory (DRAM) 30, in accordance with some embodiments of the present disclosure. Referring to FIG. 12, the DRAM 30 is similar to the DRAM 10 described and illustrated with reference to FIG. 2 except that, for example, the DRAM 30 includes an address register 34 including latches 140, 142 and 144, a memory array 32 including memory rows 122 and 124, and a buffer region 35 including buffers 36 and 38. In some embodiments, the memory rows 122 and 124 are in the same bank. In some embodiments, the memory rows 122 and 124 are in different banks.

The memory row 122 stores a row data R1 including a data D1. Moreover, the memory row 124 stores a row data R2 including a data D2. In accordance with the similar operations as described in the embodiments of FIGS. 3 and 5, the buffer 36 temporarily stores a temporarily-stored row data R10 including a temporarily-stored data D10 in response to a first request Req1 to read the data D1. The buffer 38 remains vacant. In addition, the latch 140 latches an address ADDR1 indicating the memory row 122.

Moreover, although in the present embodiment the first request Req1 is to read a data, the present disclosure is not limited thereto. In some embodiments, the first request Req1 is to write a data as described in the embodiments of FIGS. 6 to 8.

Figure 13:
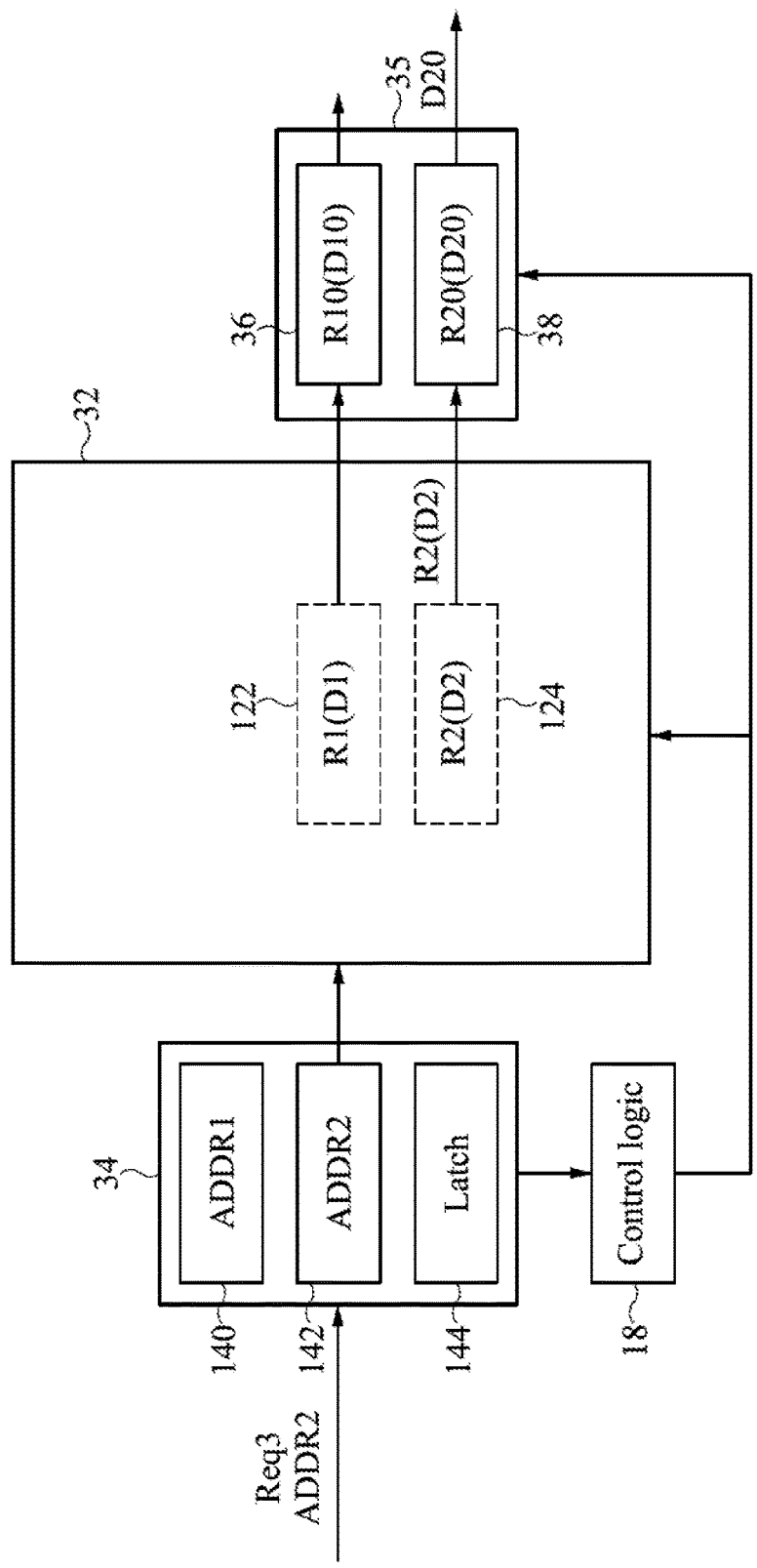
FIG. 13 is a schematic diagram illustrating another operation of the DRAM shown in FIG. 12, in accordance with some embodiments of the present disclosure.

FIG. 13 is a schematic diagram illustrating another operation of the DRAM 30 shown in FIG. 12, in accordance with some embodiments of the present disclosure. Referring to FIG. 13, the buffer 38 temporarily stores the row data R2 as a temporarily-stored row data R20 in response to a third request Req3, following the first request Req1, to read the data D2. Similarly, the buffer 38 temporarily stores the data D2 as a temporarily-stored data D20.

It should be noted that the buffer 38 also undergoes operations in response to an ACTIVE command and a PRE-CHARGE command, as described in the embodiments of FIGS. 3 to 5. The detailed descriptions are omitted herein.

The buffer 36 retains the temporarily-stored data D10 in response to the third request Req3. That is, the buffer 36 does not overwrite the temporarily-stored data D10 with the data D2.

Figure 14:
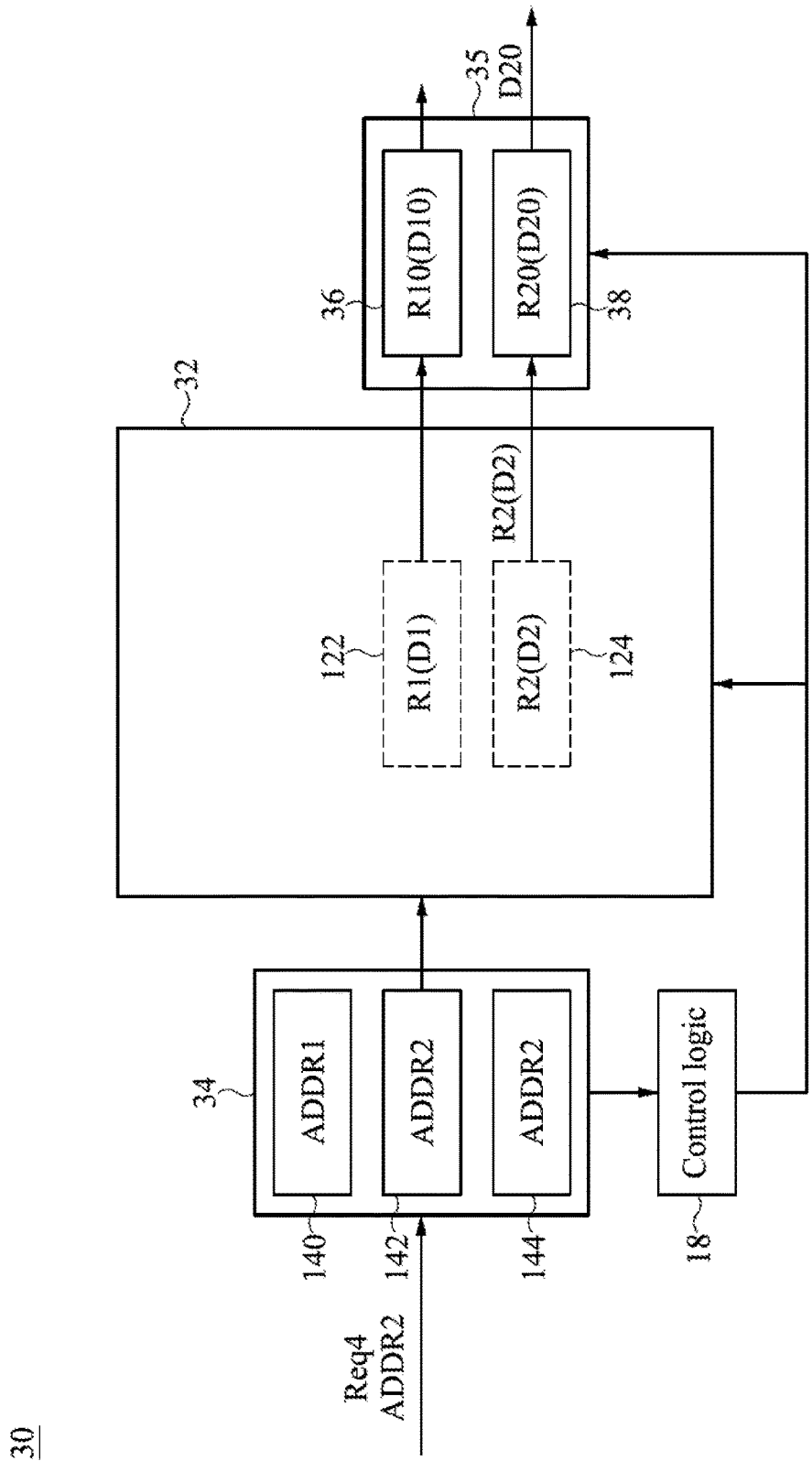
FIG. 14 is a schematic diagram illustrating still another operation of the DRAM shown in FIG. 12, in accordance with some embodiments of the present disclosure.

FIG. 14 is a schematic diagram illustrating still another operation of the DRAM 30 shown in FIG. 12, in accordance with some embodiments of the present disclosure. Referring to FIG. 14, a fourth request Req4, following the third request Req3, to read the second data D2 is received.

The latch 144 latches the address ADDR2 indicating the memory row 124 in response to the fourth request Req4. The control logic 18, according to the addresses ADDR2 latched by the latches 142 and 144, determines that there is a buffer which has stored the temporarily-stored data D20 associated with the data D2. In addition, the control logic 18 determines that the buffer is the buffer 38. Accordingly, the control logic 18 controls the buffer 38. The buffer 38 provides the second temporarily-stored data D20 in response to the fourth request Req4. There is no need to activate the memory row 124 in response to the fourth request Req4, such that the memory row 124 provides the second data D2. As a result, a read time of the DRAM 30 is conserved, and the DRAM 30 is time efficient.

Moreover, as mentioned above, although the third request Req3 requests the data D2, the temporarily-stored data D10 is retained in the buffer 36. As a result, if the fourth request Req4 is to read the first data D1, the buffer 36 is able to provide the temporarily-stored data D10. An ability the buffer region 35 to retain data increases as the quantity of buffers of the buffer region 35 increases.

Regardless whether the fourth request Req4 is to read the data D1 or the data D2, the memory rows 122 and 124 are kept deactivated.

Figure 15:
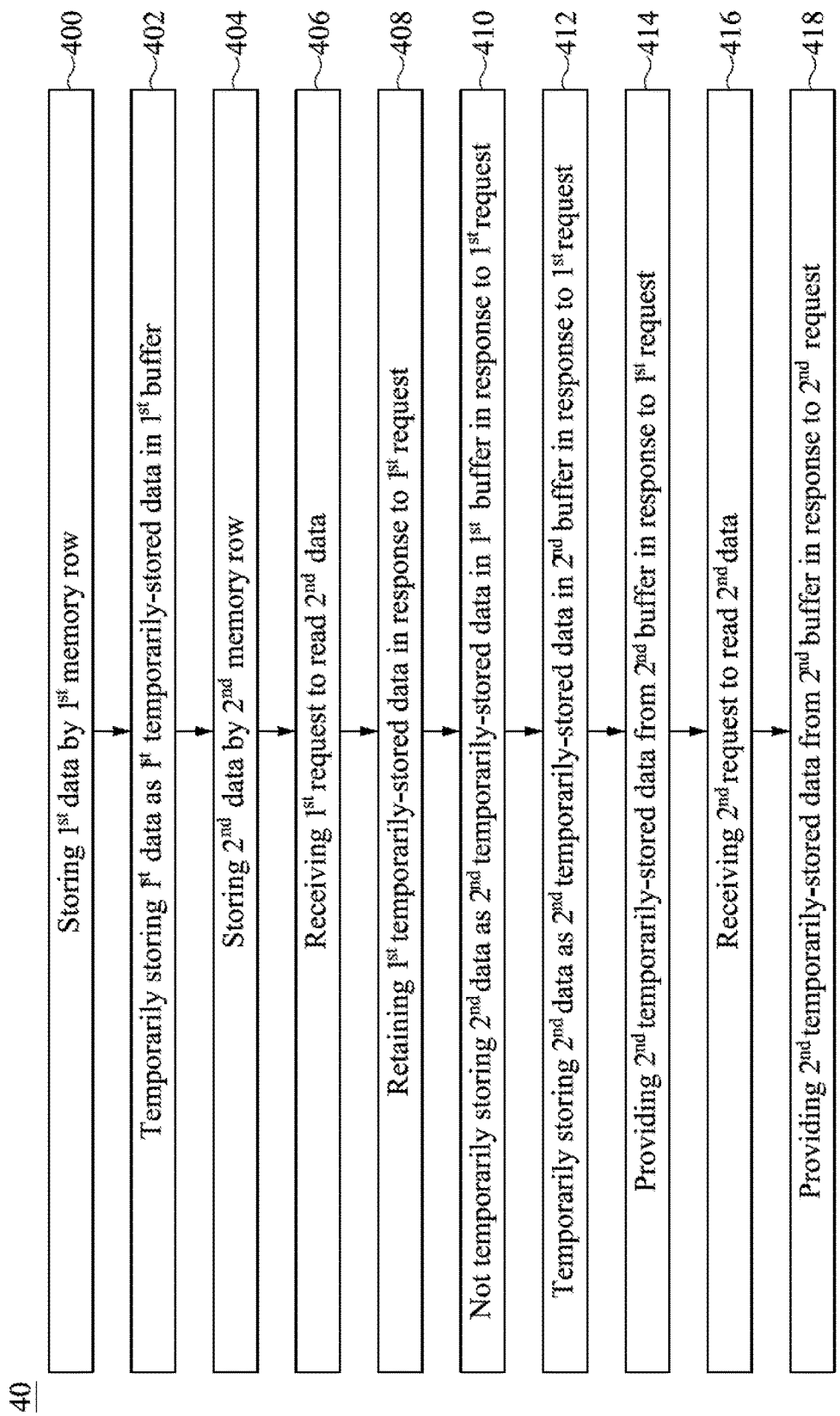
FIG. 15 is a flow chart of another method, in accordance with some embodiments of the present disclosure.

FIG. 15 is a flow chart of another method 40, in accordance with some embodiments of the present disclosure. Referring to FIG. 15, the method 40 includes operations 400, 402, 404, 406, 408, 410, 412, 414, 416 and 418.

The method 40 begins with operation 400, in which a first memory row stores a first data.

The method 40 proceeds to operation 402, in which a first buffer temporarily stores the first data as a first temporarily-stored data.

The method 40 continues with operation 404, in which a second memory row stores a second data.

The method 40 proceeds to operation 406, in which a first request to read the second data is received.

The method 40 continues with operation 408, in which the temporarily-stored data is retained in the first buffer in response to the first request.

The method 40 proceeds to operation 410, in which the first buffer does not temporarily store the second data as a second temporarily-stored data in response to the first request.

The method 40 continues with operation 412, in which the second buffer temporarily stores the second data as a second temporarily-stored data in response to the first request.

The method 40 proceeds to operation 414, in which the second buffer provides the second temporarily-stored data in response to the first request.

The method 40 continues with operation 416, in which a second request to read the second data is received.

The method 40 continues with operation 418, in which the second buffer provides the second temporarily-stored data in response to the second request.

The method 40 is merely an example, and is not intended to limit the present disclosure beyond what is explicitly recited in the claims Additional operations can be provided before, during, and after the method 40, and some operations described can be replaced, eliminated, or moved around for additional embodiments of the method.

In the present disclosure, by using the method 40 to operate a DRAM, a read time of the DRAM is conserved, and the DRAM is time efficient.

Figure 16:
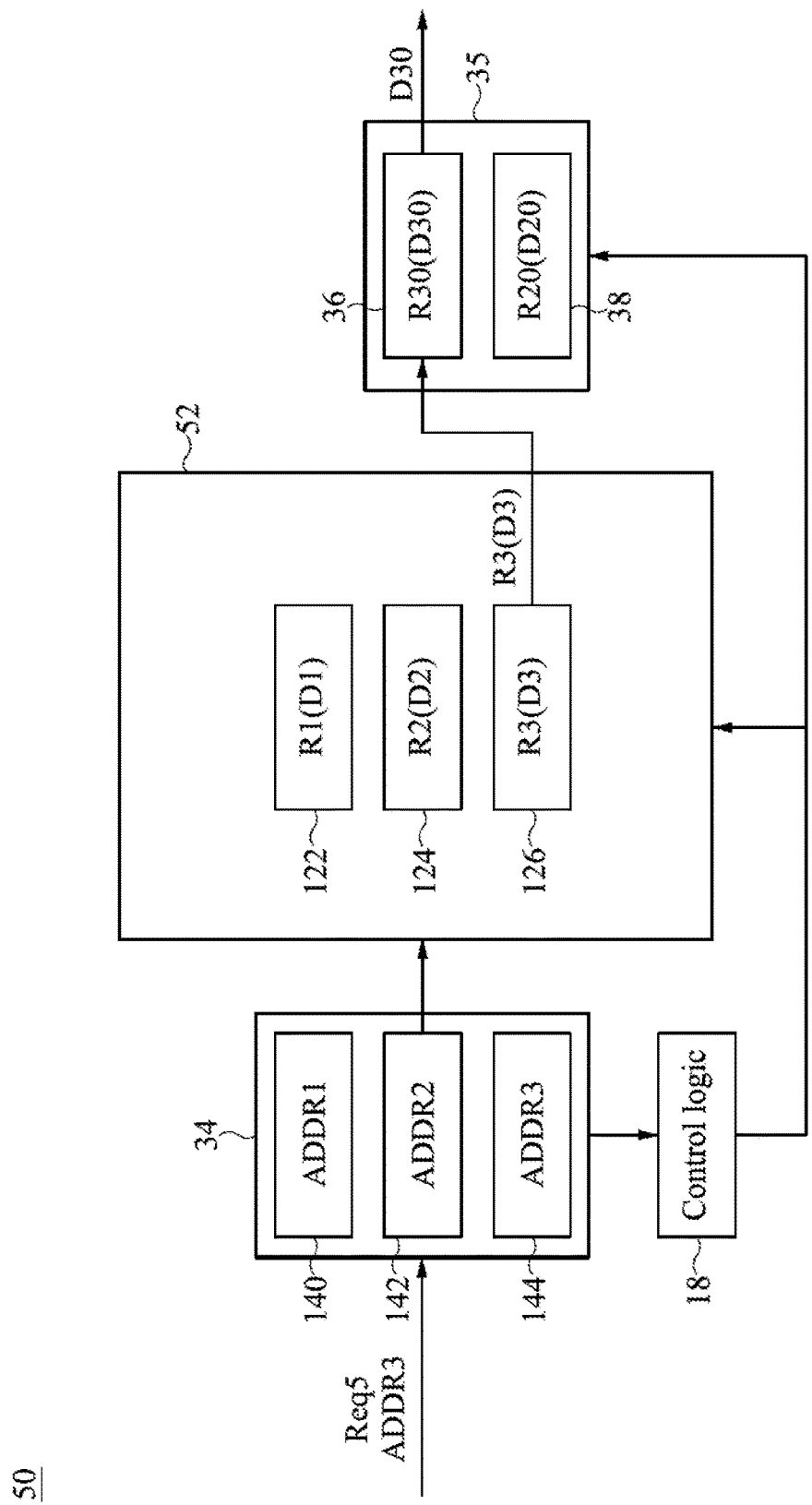
FIG. 16 is a schematic diagram illustrating an operation of still another dynamic random access memory (DRAM), in accordance with some embodiments of the present disclosure.

FIG. 16 is a schematic diagram illustrating an operation of still another dynamic random access memory (DRAM) 50, in accordance with some embodiments of the present disclosure. Referring to FIG. 16, the DRAM 50 is similar to the DRAM 30 described and illustrated with reference to FIG. 12 except that, for example, the DRAM 50 includes a memory array 52 including memory rows 122, 124 and 126. In some embodiments, the memory rows 122, 124 and 126 are in the same bank. In some embodiments, the memory rows 122, 124 and 126 are in different banks.

The memory row 126 functions to store a row data R3 including a data D3. The buffers 36 and 38 store the temporarily-stored data D10 and D20, respectively, in accordance with the operations described in the embodiment of FIG. 13.

A fifth request Req5, following the third request Req3 shown in FIG. 13, to read the third data D3 is received. The latch 144 latches an address ADDR3 indicating the memory row 126.

The control logic 18, according to the addresses ADDR1, ADDR2 and ADDR3 latched by the latches 140, 142 and 144 respectively, determines that there is no buffer which has stored a temporarily-stored data associated with the third data D3. Consequently, one of the temporarily-stored data D10 and D20 is erased. In the present embodiment, the temporarily-stored data D10 is erased. Hence, the buffer 36 is vacant. Accordingly, the buffer 36 stores the row data R3 as a temporarily-stored row data R30 in response to the fifth request Req5. Similarly, the buffer 36 stores the data D3 as a temporarily-stored data D30.

In some embodiments, the control logic 18 determines how many times a memory row is miss hit, and erases a temporarily-stored data associated with a data stored by the memory which has the greatest number of miss-hit times.

For example, when the third request Req3, following the first request Req1 to read the data D1, to read the data D2 stored by the memory row 124 is received, the control logic 18 determines that the memory row 122 is miss hit for the first time. Subsequently, when the fifth request Req5, following the third request Req3, to read the data D3 stored by the memory row 126 is received, the control logic 18 determines that the memory row 122 is miss hit twice, and the memory row 124 is miss hit for the first time. The miss-hit times of the memory row 122 are greater than those of the memory 124. Hence, the control logic 18 erases the temporarily-stored data D10 associated with the data D1 stored in the memory row 122. That is, what the buffers 36 and 38 store is temporarily-stored data associated with the memory rows 124 and 126 which are relatively often accessed. As previously mentioned, the buffers 36 and 38 are able to replace the memory rows 124 and 126 which are relatively often accessed to provide the temporarily-stored data. As a result, the DRAM 50 is relatively time efficient.

In the present disclosure, in a circumstance in which the second request Req2 requests the same data D1 as the first request Req1, there is no need to activate the memory row 122 in response to the second request Req2. The buffer 16 is able to provide the temporarily-stored data D10 as requested by the second request Req2. As a result, a read time of the DRAM 10 is conserved, and the DRAM 10 is time efficient.

In some existing DRAMs, after a memory row provides a data in response to a first request, the memory row is closed even though a second request, following the first request, requests the same data as the first data. Consequently, it is necessary to activate the memory row again in response to the second request. As a result, such DRAM is not time efficient.

In some applications, although if the first request and the second request request the same data, the memory row is able to be kept activated, it still takes time to move the data from the memory row to a buffer. As a result, such DRAM is still not time efficient.

One aspect of the present disclosure provides a DRAM. The DRAM includes a memory row and a buffer. The memory row is configured to store a data, wherein the memory row does not provide the data to the buffer in response to a request to read the data. The buffer is configured to store the data as a temporarily-stored data, wherein the buffer provides the temporarily-stored data in response to the request.

Another aspect of the present disclosure provides a DRAM. The DRAM includes a first memory row, a second memory row, a first buffer and a second buffer. The first memory row is configured to store a first data. The second memory row is configured to store a second data. The first buffer is configured to temporarily store the first data as a first temporarily-stored data in response to a first request to read the first data. The second buffer is configured to store the second data as a second temporarily-stored data in response to a second request, following the first request, to read the second data, wherein the first buffer retains the first temporarily-stored data in response to the second request, and wherein the first buffer provides the first temporarily-stored data in response to a third request, following the second request, to read the first data.

Another aspect of the present disclosure provides a method. The method includes storing a data by a memory row, and not providing the data by the memory row in response to a request to read the data.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, and composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A dynamic random access memory (DRAM), comprising:
    a memory row configured to store a data in response to a first request to access the data, wherein the memory row does not provide the data in response to a second request, following the first request, to read the data; and
    a buffer configured to temporarily store the data as a temporarily-stored data in response to the first request, wherein the buffer provides the temporarily-stored data in response to the second request.

2. The DRAM of claim 1, wherein the memory row is kept deactivated when the buffer provides the temporarily-stored data in response to the second request.

3. The DRAM of claim 1, wherein the first request is a request to read the data from the memory row.

4. The DRAM of claim 1, further comprising:
    an address register including:
        a first latch configured to latch a first address indicating the memory row in response to the first request; and
        a second latch configured to latch the first address in response to the second request; and
    a control logic configured to keep the memory row deactivated and control the buffer to directly provide the temporarily-stored data in response to an event, in which both the first latch and the second latch latch the first address.

5. The DRAM of claim 1, wherein the first request is a request to write the data to the memory row.

6. The DRAM of claim 5, further comprising:
    an address register including:
        a first latch configured to latch a first address indicating the memory row in response to the first request; and
        a second latch configured to latch the first address in response to the second request; and
    a control logic configured to keep the memory row deactivated in response to an event, in which both the first latch and the second latch latch the first address.

7. A dynamic random access memory (DRAM), comprising:
    a first memory row configured to store a first data;
    a second memory row configured to store a second data;
    a first buffer configured to temporarily store the first data as a first temporarily-stored data in response to a first request to read the first data; and
    a second buffer configured to temporarily store the second data as a second temporarily-stored data in response to a second request, following the first request, to read the second data, wherein the first buffer retains the first temporarily-stored data in response to the second request, and
    wherein the first buffer provides the first temporarily-stored data in response to a third request, following the second request, to read the first data.

8. The DRAM of claim 7, wherein the second buffer provides the second temporarily-stored data in response to a fourth request, following the second request, to read the second data.

9. The DRAM of claim 7, wherein the first buffer does not temporarily store the second data as the second temporarily-stored data in response to the second request.

10. The DRAM of claim 7, wherein the memory row is kept deactivated when the first buffer provides the first temporarily-stored data in response to the third request.

11. The DRAM of claim 7, further comprising:
an address register including:
  a first latch configured to latch a first address indicating the first memory row in response to the first request; and
  a second latch configured to latch a second address in response to the second request; and
  a third latch configured to latch the first address in response to the third request; and
a control logic configured to keep the first memory row deactivated and control the first buffer to directly provide the first temporarily-stored data in response to an event, in which both the first latch and the third latch latch the first address.

12. The DRAM of claim 7, further comprising:
a third memory row configured to store a third data,
wherein one of the first buffer and the second buffer temporarily stores the third data as a third temporarily-stored data in response to a fifth request, following the second request, to read the third data.

13. The DRAM of claim 12, wherein the first buffer temporarily stores the third temporarily-stored data in response to the fifth request.

14. The DRAM of claim 13, wherein the second buffer provides the second temporarily-stored data in response to a sixth request, following the fifth request, to read the second data.

15. The DRAM of claim 13, wherein the first memory row is of a first bank of the DRAM, and the second memory row is of a second bank of the DRAM.

16. A method, comprising:
storing a data and providing the data by a memory row in response to a first request to access the data; and
not providing the data from the memory row in response to a second request, following the first request, to read the data.

17. The method of claim 16, further comprising:
storing the data as a temporarily-stored data in a buffer in response to the first request; and
providing the temporarily-stored data from the buffer in response to the second request.

18. The method of claim 17, further comprising:
keeping the memory row deactivated when the buffer provides the temporarily-stored data in response to the second request.

19. The method of claim 17, wherein the first request is a request to read the data from the memory row.

20. The method of claim 17, wherein the first request is a request to write the data into the memory row.

* * * * *